May 21, 1946.  O. E. WOLFF  2,400,585
CLUTCH MECHANISM
Filed Jan. 13, 1942  7 Sheets-Sheet 1
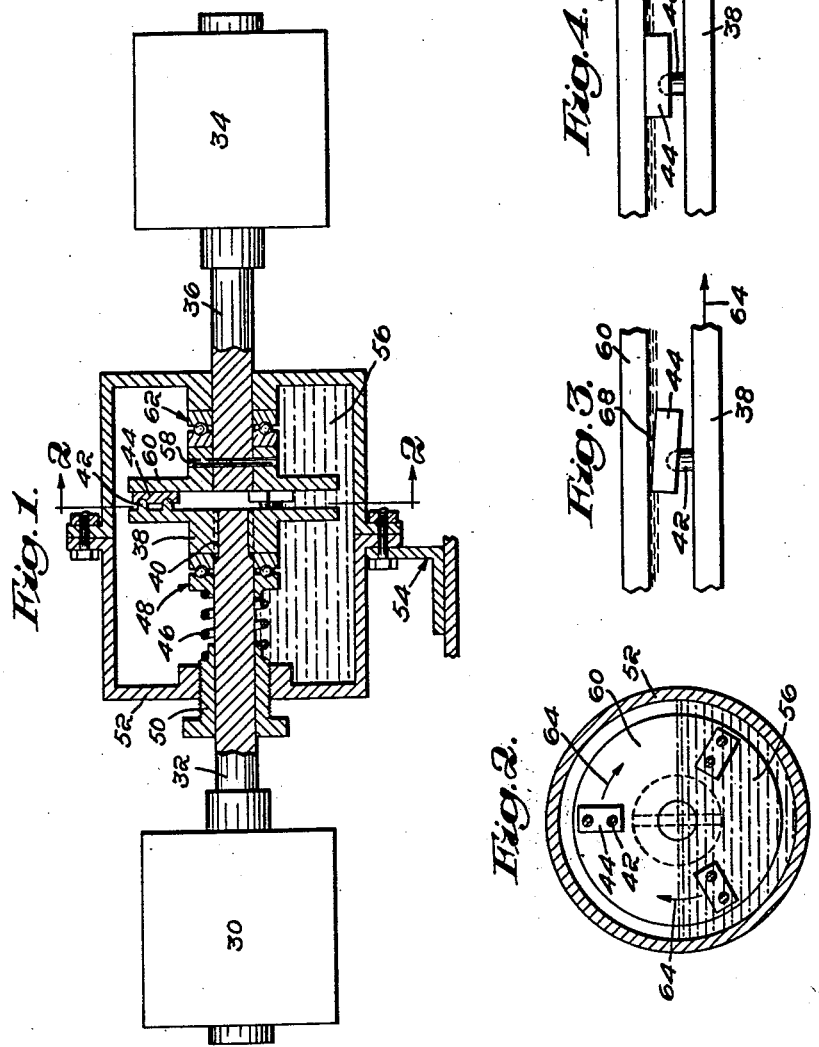
Inventor:
Otto E. Wolff
by Donald L. Brown
Attorney May 21, 1946. O. E. WOLFF 2,400,585
CLUTCH MECHANISM
Filed Jan. 13, 1942 7 Sheets-Sheet 2
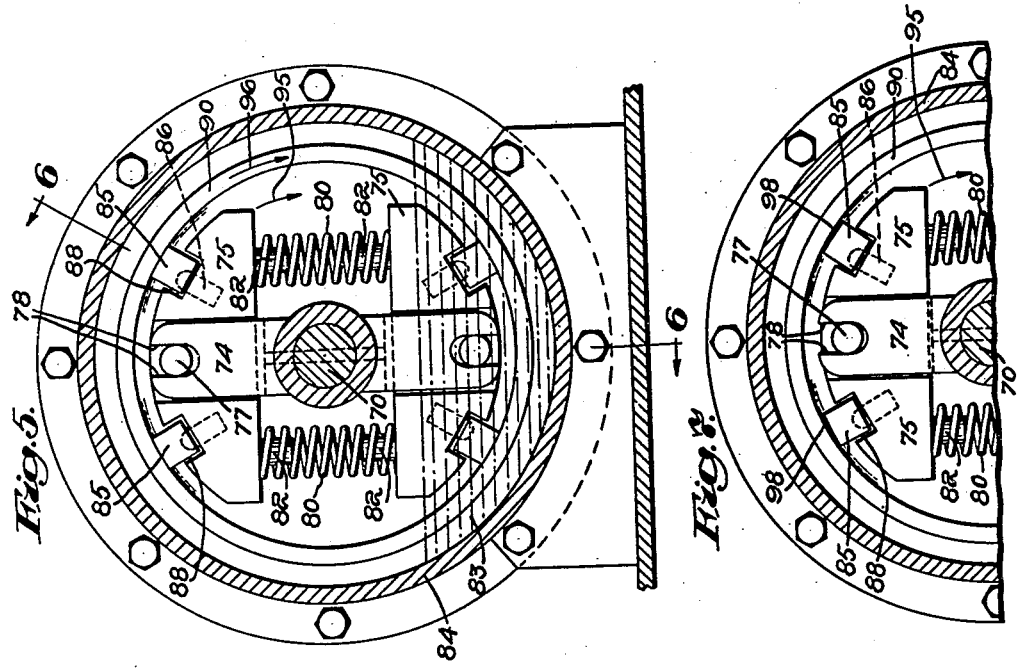
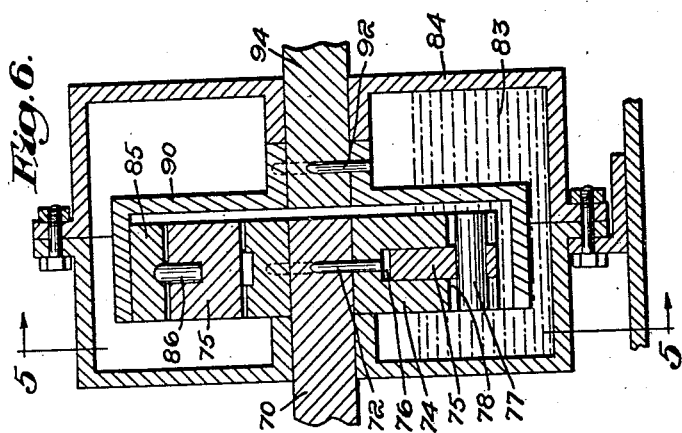
Inventor:
Otto E. Wolff
by Donald L. Brown
Attorney

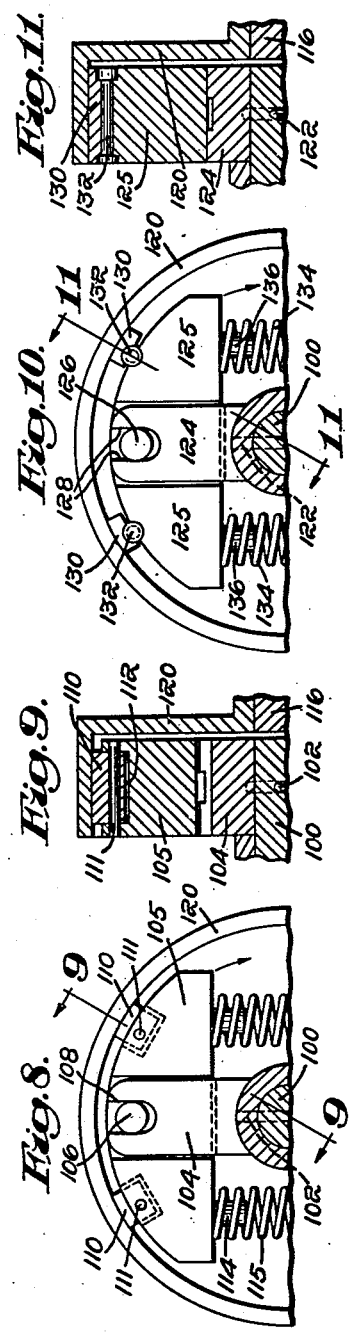

May 21, 1946.  O. E. WOLFF  2,400,585
CLUTCH MECHANISM
Filed Jan. 13, 1942   7 Sheets-Sheet 4
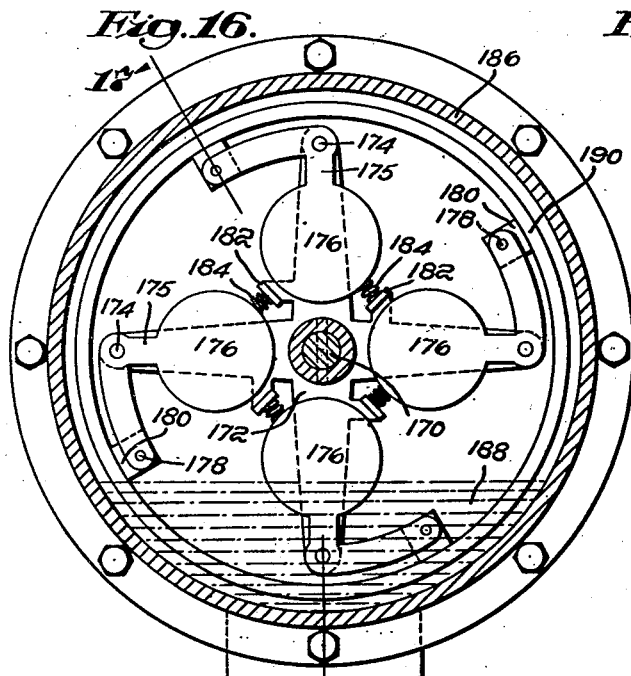
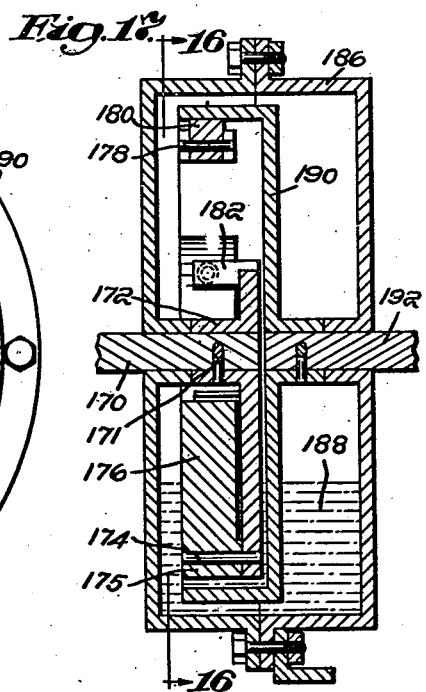
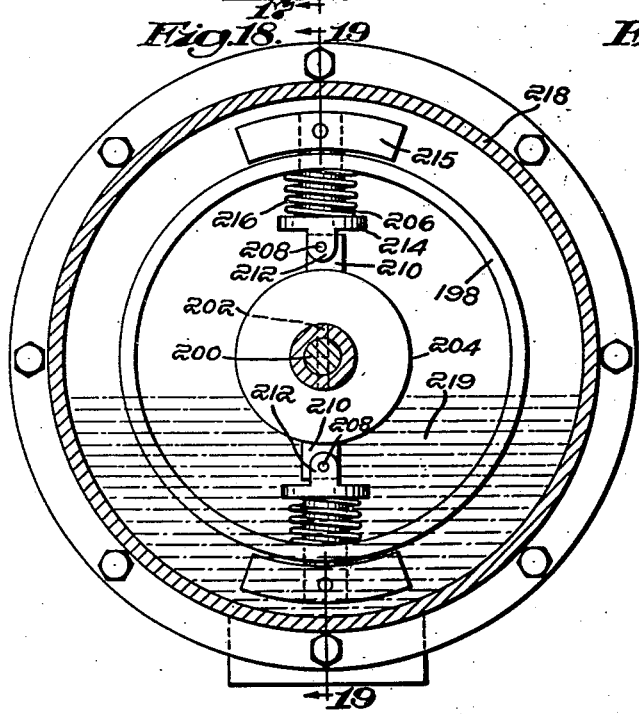
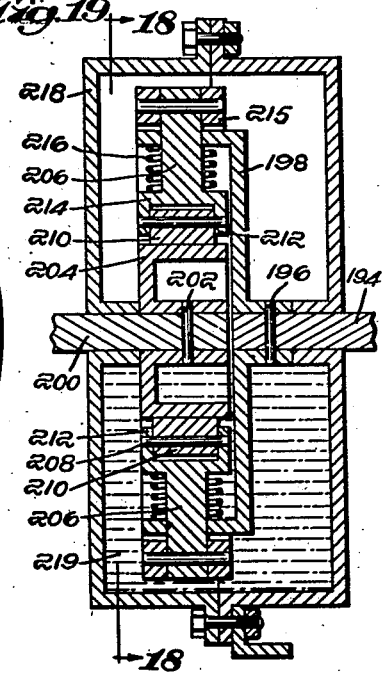
Inventor:
Otto E. Wolff
by Donald Brown
Attorney

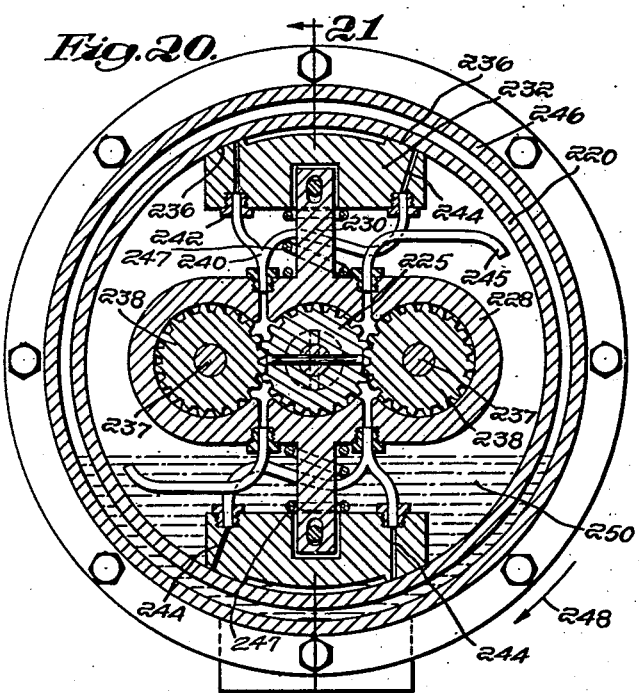
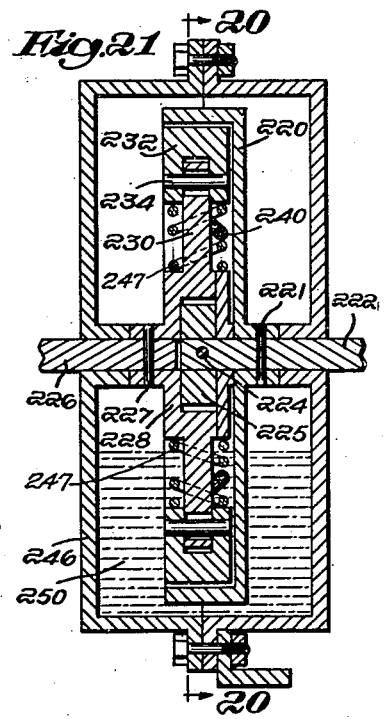
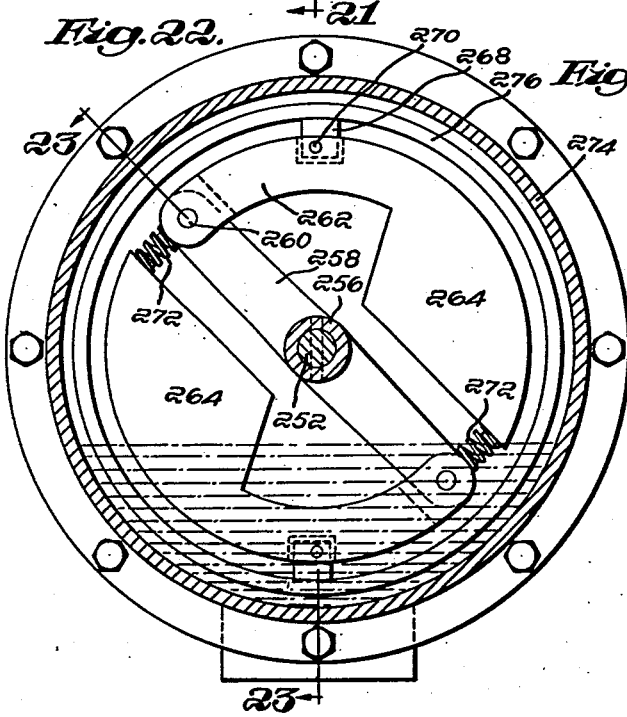
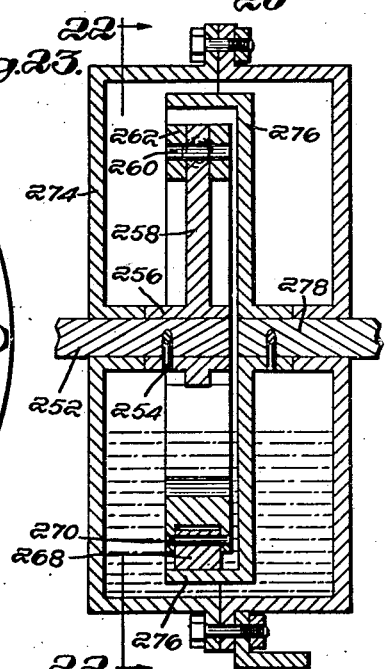

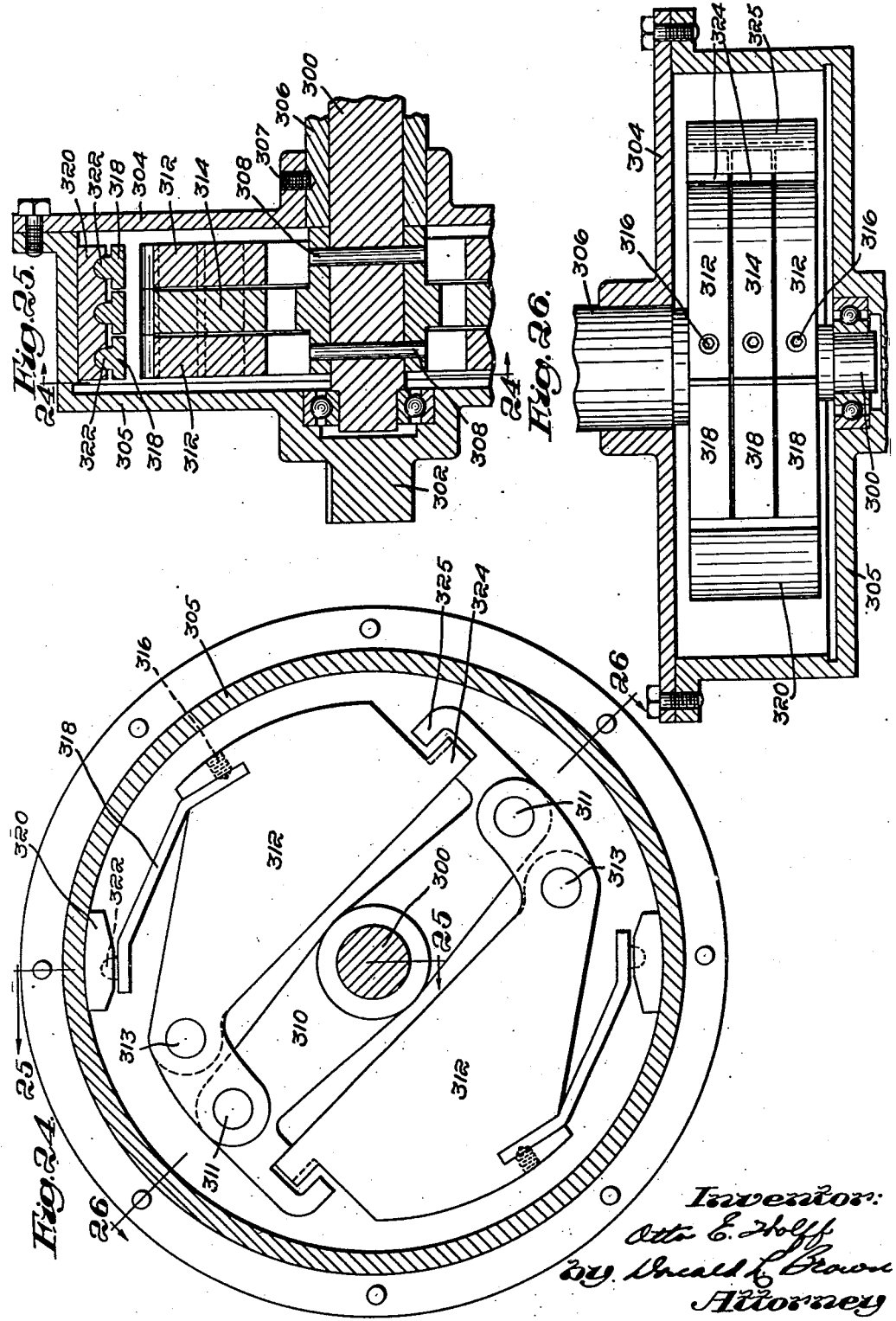

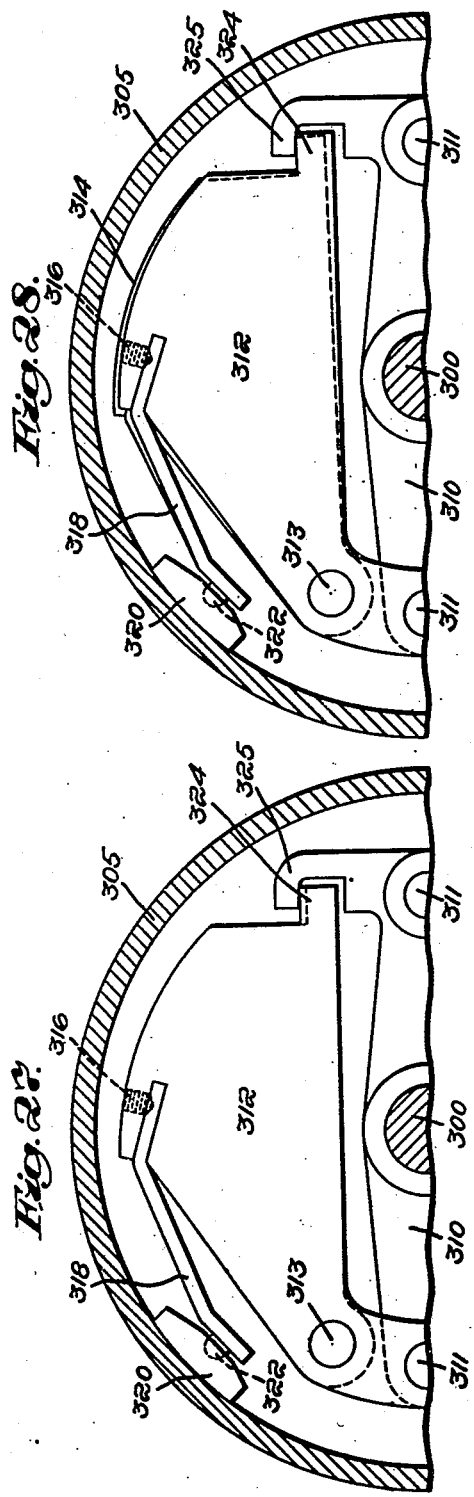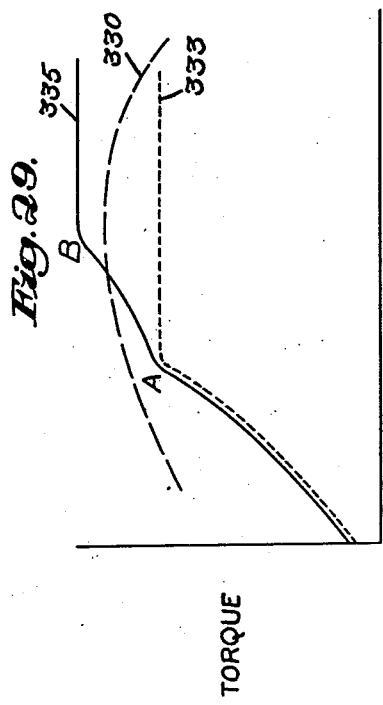

Patented May 21, 1946

2,400,585

UNITED STATES PATENT OFFICE 2,400,585

CLUTCH MECHANISM

Otto E. Wolff, Chestnut Hill, Mass., assignor of one-fourth to Polaroid Corporation, Cambridge, Mass., a corporation of Delaware Application January 13, 1942, Serial No. 426,615

36 Claims. (Cl. 64—30)

This invention relates to clutch mechanisms, and particularly to the type of friction clutch in which engagement and disengagement are produced by changes in driving conditions.

It is one object of the present invention to provide a clutch which will be caused to disengage automatically by excessive load or speed or sudden changes in speed, and hence a clutch which is particularly adapted for use in tools such as screw drivers and nut runners, or as a safety clutch in a motor drive.

Another object is to provide a clutch of the above type which is particularly adapted for use in automatic gear-changing devices.

A further object is to provide a friction clutch of the above type which is adapted to produce engagement between a driving and a driven member when both members are moving at substantially the same speed, but which is adapted to disengage in the event of a change in relative speed between said members.

A still further object is to produce a clutch of the above type wherein engagement is produced by frictional locking between elements carried by the driving and driven members, and wherein disengagement is produced by reducing the coefficient of friction between said frictionally locked elements.

A still further object is to provide a clutch of the above type wherein reduction of the coefficient of friction between the engaging portions of the driving and driven members is accomplished by the introduction therebetween of anti-friction means such as a lubricant, and more particularly a relatively thin film of a lubricating fluid.

A still further object is to provide a clutch of the above type wherein the means for introducing lubricant between the frictionally engaged portions of the driving and driven members is responsive to relative motion or excessive driving load between said members.

A still further object is to provide a clutch of the above type wherein engagement between the driving and driven members is accomplished by means of friction elements such as clutch shoes carried by one of said members and adapted to engage a complementary element such as a disk or drum carried by the other of said members, and wherein disengagement is accomplished by the introduction of a thin film of a lubricating fluid between said shoes and said complementary element.

Other objects and advantages will in part appear and in part be pointed out in the course of the following detailed description of several embodiments of the invention, which are given as non-limiting examples and are illustrated in the accompanying drawings, in which:

Figure 1 is a view, partially diagrammatic and partially in section, illustrating one embodiment of the invention;

Fig. 2 is a section on the line 2—2 in Fig. 1;

Figs. 3 and 4 are detailed views in elevation illustrating the operation of one of the clutch shoes and complementary clutch element of the device shown in Fig. 1, Fig. 3 illustrating the relative positions of the elements when the clutch is disengaged, and Fig. 4 illustrating the relative positions when the clutch is engaged;

Fig. 5 is a section, taken on the line 5—5 in Fig. 6, showing a clutch device embodying a modification of the invention, said clutch being shown in engaged position;

Fig. 6 is a sectional view of the device shown in Fig. 5 and taken on the line 6—6 in Fig. 5;

Fig. 7 is a half section view similar to Fig. 5, but showing the clutch disengaged;

Fig. 8 is a fragmentary section similar to Fig. 5 showing a clutch device embodying a further modification of the invention;

Fig. 9 is a section on the line 9—9 in Fig. 8;

Fig. 10 is a view similar to Fig. 8 showing another modification of the invention;

Fig. 11 is a section on the line 11—11 in Fig. 10;

Fig. 12 is a view similar to Figs. 8 and 10 showing a further modification of the invention;

Fig. 13 is a section on the line 13—13 in Fig. 12;

Fig. 14 is a view similar to Figs. 8, 10 and 12 showing a further modification of the invention;

Fig. 15 is a section on the line 15—15 in Fig. 14;

Fig. 16 is a view similar to Fig. 5 showing a further modification of the invention and taken along the line 16—16 in Fig. 17;

Fig. 17 is a section on the line 17—17 in Fig. 16;

Fig. 18 is a view similar to Fig. 5 showing a further modification of the invention and taken along the line 18—18 in Fig. 19;

Fig. 19 is a section on the line 19—19 in Fig. 18;

Fig. 20 is a view similar to Fig. 5 showing a further modification of the invention and taken along the line 20—20 in Fig. 21;

Fig. 21 is a section on the line 21—21 in Fig. 20;

Fig. 22 is a view similar to Fig. 5 showing a further modification of the invention and taken along the line 22—22 in Fig. 23;

Fig. 23 is a section on the line 23—23 in Fig. 22;

Fig. 24 is a view similar to Fig. 5 showing a clutch device embodying a modified form of the invention provided with means for controlling the torque characteristics of said clutch, and taken along the line 24—24 extended in Fig. 25;

Fig. 25 is a partial section on the line 25—25 in Fig. 24;

Fig. 26 is a plan view of the device shown in Fig. 24, with part of the casing broken away, along the line 26—26;

Figs. 27 and 28 are fragmentary views similar to Fig. 24, illustrating the relative positions of the parts during various stages of the operation thereof; and Fig. 29 is a graph indicating torque characteristics which may be achieved with a clutch of the type shown in Figs. 24-28.

Referring to Fig. 1, a motor or other source of power 30 is adapted to rotate driving shaft 32, and act upon any load or work 34 adapted to be coupled to driven shaft 36. It is an object of the present invention to provide simple clutching means adapted upon engagement to lock shafts 32 and 36 together, and adapted thereafter to disengage completely in the event of relative motion between said shafts. It should be understood, however, that although shaft 32 is described as the driving shaft and shaft 36 as the driven shaft, the relation of these two elements may be reversed without departing in any way from the principles of the invention.

According to the invention, engagement between the driving and driven members is accomplished by bringing about frictional engagement between clutch elements such as clutch shoes carried by one member and a complementary clutch element carried by the other member, and disengagement is brought about by providing means for suddenly reducing the coefficient of friction between the clutch elements carried by one member and those carried by the other member. In the preferred embodiment of the invention, reduction of the coefficient of friction is accomplished by introducing a thin film of lubricant such as oil between the complementary clutch shoes.

Referring again to Fig. 1, on the end of shaft 32 there is mounted a clutch shoe carrying member 38 which may conveniently comprise a disk or similar element. Disk 38 is preferably secured to shaft 32 by means of a splined or other adjustable connection 40 which will permit sliding motion thereof along the shaft. Mounted on disk 38, as by means of pins or lugs 42, are a plurality of clutch shoes 44 which will be described in more detail hereinafter.

Sliding movement of disk 38 along shaft 32 is preferably against the tension of a spring, such for example as spring 46, and thrust bearing 48 of any conventional type. It will also be found advantageous to provide means for controlling the tension of spring 46, and an example of suitable means is shown as comprising bushing 50 threaded or otherwise adjustably mounted in the side of housing 52. Said housing may, if desired, be provided with any conventional supporting means such as that indicated at 54 in Fig. 1, and is preferably partially filled with a lubricating fluid such as an oil, as indicated at 56.

Driven shaft 36 carries fixedly secured thereon, as by any conventional means such as key 58, a complementary clutch element which, in the embodiment shown in Fig. 1, comprises a disk or plate 60. Preferably there will also be provided suitable anti-friction means between disk 60 and housing 52, such for example as thrust bearing 62 of conventional design. Clutching engagement between shafts 32 and 36 is accomplished by bringing clutch shoes 44 carried by disk 38 into solid-to-solid contact with the face of disk 60.

As is shown in Figs. 3 and 4, shoes 44 are preferably so mounted that they are free to rock about an axis substantially perpendicular to their direction of motion and parallel to the plane of the frictionally engaging surfaces. In some cases it may be desirable to facilitate the disengaging operation of the shoes by locating said axis behind the center of said shoe surface, as is shown in Figs. 3 and 4. This is not essential, however, as satisfactory results will be obtained if the axis be located at the center of the shoe, especially if the leading and trailing edges thereof are slightly rounded. The preferred operation with the type of mounting shown in Figs. 1-4 is facilitated by providing the mounting pins or lugs 42 with hemispherically shaped heads in order to secure self-alignment thereon of the shoes, as is indicated in Figs. 3 and 4. It is to be understood, however, that many other types and shapes of shoes and mountings may be used within the scope of the invention, some samples of which are shown in others of the accompanying drawings and will be described hereinafter.

In the operation of the embodiment of the invention shown in Figs. 1-4, spring 46 is first adjusted by means of bushing 50 to exert a predetermined force along shaft 32 against disk 38. This will result in pressing shoes 44 carried by said disk against the face of disk 60, thus forcing any lubricant out from between their opposing surfaces and causing said shoes to engage disk 60 in solid-to-solid, static frictional contact, as in the position shown in Figs. 1 and 4.

It will now be seen that when shafts 32 and 36 are stationary they will be locked together through the described action of the clutch elements, with the degree of friction between shoes 44 and disk 60 depending partly upon the tension of spring 46 and partly upon the materials of which they are made. If now rotation is imparted to shaft 32, as for example in the direction indicated by arrows 64, then, so long as load 34 on shaft 36 does not overcome the friction between shoes 44 and disk 60, the latter will remain in engagement and shaft 36 will rotate with shaft 32, as is indicated by arrow 66 in Fig. 4.

Assuming that shafts 32 and 36 are rotating as described above, let it now be assumed that load 34 is increased to a point such that it overcomes the friction between shoes 44 and disk 60. For example, load 34 might represent a generator the load on which becomes excessive, or the same result may be produced by rapid acceleration of shaft 32, which will increase the inertia load on the clutch. This will immediately bring about relative motion between shafts 36 and 32, and slippage will result between shoes 44 and disk 60.

As soon as slippage occurs with the type of shoe shown in Figs. 1-4, the resistance of lubricant 56 to being sheared away from the relatively moving surfaces causes the shoes to tilt about the heads of mounting lugs 42 and to ride up on a continuously reforming, thin, wedge-like film of lubricant, as is indicated at 68 in Fig. 3, simultaneously moving the disk 38 along shaft 32 against the action of spring 46. This produces an immediate large drop in the coefficient of friction between the clutch elements and thus causes sudden, complete disengagement. It should be pointed out, however, that the degree of tilt is considerably exaggerated in Fig. 3, and in practice will amount to a relatively very small angle.

The existence of lubricant film 68 between shoes 44 and disk 60 depends upon relative motion between their adjacent surfaces. So long as there is such relative motion, the clutch will not reengage, and to a considerable extent, the greater the relative velocity the greater the bearing pressure which can be withstood by film 68. Other factors, however, contributing to the maintenance of the film include the viscosity of the lubricant, the smoothness of the complementary clutch surfaces, and the proportions of the shoe surfaces. It is in general preferable to have said proportions such that the longer dimension thereof is perpendicular to the direction of slippage, as shown in Fig. 2.

It will be seen that slippage will occur as described above whenever the load on shaft 36 exceeds the frictional contact between shoes 44 and disk 60 resulting from adjustment of spring 46. Furthermore, the result will be the same if excess load is applied on shaft 36 after the clutch is engaged and both shafts are rotating together or if the load is initially excessive. After slippage has occurred there will be relatively little turning effort exerted on shaft 36 by shaft 32, and that little will result primarily from fluid drag between shoes 44 and disk 60.

In order to re-engage the clutch, it is necessary to eliminate the film of lubricant from between the clutch elements, and this is most conveniently accomplished by bringing the relatively moving clutch elements again to substantially the same speed. In order to accomplish this result with the embodiment of the invention shown in Figs. 1–4, the excess load should first be removed from shaft 36. For example, if as mentioned above load 34 represents a generator the load on which has become excessive, the excess may be removed electrically as by opening the circuit therefrom. As another example, if load 34 represents a screw driver or nut runner driven by shaft 36, after the screw or nut is completely tightened, the resulting excess load on shaft 36 may be removed by disengaging the head of the tool from the screw or nut. If the excess load is inertia load resulting from sudden acceleration of shaft 32, it may be removed simply by decelerating said shaft.

After the excess load has been removed, the speeds of the two shafts may conveniently be synchronized by slowing down shaft 32 to the speed of shaft 36, while at the same time fluid drag between shoes 44 and disk 60 will tend to increase the speed of shaft 36. As the two speeds approach each other, the load-supporting ability of film 68 rapidly decreases until at the point of synchronization, solid-to-solid contact between the complementary clutch elements is again established, thus producing a large rise in the friction therebetween and resulting in re-engagement of the clutch. Thereafter shaft 32 may again be accelerated so long as the load on shaft 36 does not exceed the maximum which can be transmitted by the frictionally engaging elements of the clutch.

Figs. 5–7 illustrate a centrifugal type of clutch embodying a modification of the invention, which may be used, for example, in place of the assembly shown in Fig. 1. In Figs. 5–7, shaft 70 may be considered as the driving shaft, and corresponds to shaft 32 in Fig. 1. Shaft 70 has secured thereon, as by means of a key or similar locking device 72, an element 74 adapted to carry a plurality of centrifugal weights 75. In the embodiment of the invention shown in Figs. 5–7, element 74 comprises a double-ended fork, and weights 75 are mounted within slots 76 therein by means of pins 77 engaging in slots 78. It is to be understood, however, that weights 75 may be mounted on shaft 70 by any similar means which will permit radial movement thereof with respect to the center of said shaft. There are also preferably provided means for maintaining weights 75 in spaced relation, such for example as springs 80 provided with suitable locating pins 82 carried by said weights.

As in the embodiment of the invention shown in Fig. 1, housing 84 is preferably partially filled with a suitable lubricant 83.

Each of weights 75 is provided with means for mounting and carrying a plurality of clutch shoes 85 corresponding to clutch shoes 44 in Figs. 1–4. Shoes 85 may conveniently be mounted on suitable pins 86 corresponding to pins 42 in Figs. 1–4 and formed integrally with or otherwise mounted in or secured to weights 75. Said weights may also, if desired, be provided with locating slots 88 adapted to receive shoes 85 therewithin, but it is to be understood that any other type of shoe or shoe mounting means may be employed, such for example as those shown in others of the drawings herein. The remainder of the clutch assembly shown in Figs. 5–7 comprises drum member 90, which corresponds to disk 60 in Figs. 1–4, and which may be mounted by any conventional locking means such as key 92 on shaft 94, which may be considered as the driven shaft and corresponds to shaft 36 in Fig. 1.

The operation of the embodiment of the invention shown in Figs. 5–7 is analogous to that of the embodiment of the invention shown in Figs. 1–4, but differs therefrom to some extent in its reliance upon centrifugal force. If, in Fig. 5 the elements are assumed to be stationary, it will be seen that weights 75 are pushed radially outward in slots 76 by the action of springs 80, and shoes 85 will accordingly be in solid-to-solid contact with the interior of drum 90, the degree of friction therebetween being dependent upon the compression of springs 80.

When now motion is imparted to shaft 70, as for example in the direction indicated by arrow 95, if the pressure of springs 80 is sufficient to maintain shoes 85 in frictional contact with drum 90, the latter and shaft 94 will similarly be caused to rotate in unison with shaft 70, as indicated by arrow 96. Furthermore, as the speed of shaft 70 is increased, centrifugal force will urge weights 75 outwards, and will thus progressively increase the load on shoes 85 and thus the friction between said shoes and drum 90. It will be seen, therefore, that the load which the clutch is capable of transmitting will increase as the speed of the driving shaft is increased. On the other hand, it should be noted that if the load on the driven shaft is initially sufficient to overcome the friction between shoes 85 and drum 90 produced by springs 80, then slippage between the shoes and drum will take place as soon as the driving shaft begins to rotate, and the clutch will accordingly be unable to engage.

Figs. 5–6 show the relative positions of the clutch elements both when the device is stationary and when both shafts are rotating at the same speed when the clutch is engaged. If now a load is applied on shaft 94 which will exceed the maximum which can be transmitted through the friction between shoes 85 and drum 90, slippage will occur in the same manner and for the same reasons as explained in connection with Figs. 1–4, with the result that the clutch will automatically disengage, and the parts will then assume the relations indicated in Fig. 7. Shoes 85 will tilt on pins 86 and ride up on the film of oil indicated at 98 in Fig. 7, and the weights 75 will simultaneously be forced inwardly against the action of springs 80. As was pointed out in connection with the device shown in Fig. 1, lubricant film 98 is capable of withstanding a relatively high bearing pressure, and the greater the relative velocity between the two shafts, the greater the pressure which can be borne by the film.

After slippage has occurred, the clutch may be re-engaged in the same manner as described above in connection with Figs. 1-4, namely by synchronizing the speeds of the two shafts. Assuming, for example, that disengagement has been produced by sudden acceleration of shaft 70, re-engagement may be produced by decelerating said shaft. At the same time fluid drag between shoes 85 and drum 90 will cause the speed of the latter to increase until at the point of synchronization film 98 will be forced out from between the opposing faces of the shoes and drum, and solid-to-solid contact therebetween will again be established.

If in the above example disengagement has been caused by increase of the load on the driven shaft, it may be necessary, as was explained above in connection with Figs. 1-4, to remove said excess before re-engaging the clutch, if it is greater than the maximum load which can be transmitted thereby. It should be understood, however, that re-engagement will always take place when the speeds of the two shafts are synchronized, even though the load on the driven shaft is still in excess of the maximum load capable of being transmitted by the clutch. That is to say, the clutch will re-engage when the synchronization point is reached, even though the load be such that slippage will again occur as soon as the driving shaft is accelerated. It will further be seen that in view of the centrifugal operation of the clutch shown in Figs. 5-7, it is capable of transmitting greater loads without slippage at high speeds than at low speeds, and that it may transmit a load when engaged and rotating at high speed, which would cause slippage and disengagement if it were applied to the driven shaft while the device is rotating at a relatively low speed.

Figs. 8-15 are fragmentary views showing modifications of the invention which may be substituted for the clutch elements in the device shown in Figs. 5-7. In Figs. 8 and 9, shaft 100 corresponds to shaft 70 in Figs. 5-7 and may be considered as the driving shaft. Shaft 100 has secured thereto, as by means of a key 102, a weight-carrying element 104, which may for example be substantially the same as element 74 in Figs. 5-7. Centrifugal weight 105 may be mounted in fork element 104 in the same manner as weights 85 in Figs. 5-7, as by means of pins 106 engaging in slots 108 in element 104. Clutch shoes 110 correspond to shoes 85 in Figs. 5-7 but are of a somewhat modified shape and are provided with modified mounting means comprising pins 111 engaging sides of slots 112 in weights 105. Locating pins 114 and springs 115 correspond to pins 82 and springs 80 in Figs. 5 and 7.

Driven shaft 116 in Figs. 8 and 9 corresponds to shaft 94 in Figs. 5-7 and has secured thereto a drum 120 which corresponds to drum 90 in Figs. 5-7. It will be apparent that the operation of this modification is substantially the same as that described in connection with the structure shown in Figs. 5-7. When shafts 100 and 116 are rotating at the same speed, shoes 110 will engage drum 120 in the manner indicated in Fig. 8, and when there is relative movement between said shafts, shoes 110 will pivot on pins 111 in the same manner as shoes 85 pivot on pins 86 and the weights 105 will move inwardly in the manner described in connection with weights 75 and so cause disengagement of the clutch.

Figs. 10 and 11 are similar to Figs. 8 and 9, and show another modification of the clutch shoes and mounting means therefor which may be substituted in the device shown in Figs. 5-7. In Figs. 10 and 11, shafts 100 and 116 and drum 120 correspond to the similarly numbered elements in Figs. 8 and 9. Shaft 100 has keyed thereto at 122 a weight-carrying element 124 which may, for example, be substantially the same as fork 104 in Figs. 8 and 9. Element 124 is adapted to carry a plurality of centrifugal weights 125, which may be mounted therein by any suitable means as described above, such as pins 126 engaging in slots 128.

Clutch shoes 130 in Figs. 10 and 11 correspond to the other clutch shoes described above but are of a somewhat modified shape and each is provided with a groove adapted to receive a dumbbell-shaped roller 132 engaging a complementary slot or groove in the rim of weights 125. Springs 134 and pins 136 correspond to springs 80 and pins 82 in Figs. 5 and 7.

The operation of this embodiment of the invention is substantially the same as described above in connection with Figs. 5-7. It should be pointed out that the mounting means for shoes 130 may, if desired, be varied in several ways. For example, rollers 132 may be made integral with either weights 125 or shoes 130 and may engage a suitable complementary slot in the cooperating element. In either case shoes 130 will be free to rock on an axis perpendicular to their direction of motion, as described above in connection with Figs. 1-4. It should be pointed out, furthermore, that any of the different types of shoes and shoe mountings shown in Figs. 8-11 may if desired be substituted for the type of shoe and shoe mounting shown in Figs. 1-4, without in any way affecting the principle of the operation of the device or departing from the scope of the invention.

In Figs. 12 and 13 there is shown a further modification of the invention which may be substituted for that shown in Figs. 5-7. Driving shaft 137 has keyed or otherwise secured thereto at 138 a weight-carrying element which in the embodiment of the invention shown in Figs. 12 and 13 comprises a disk or hub 140 provided with a plurality of radially extending arms 142. Each of said arms fits loosely within a slot 144 in one of a plurality of centrifugal weights 145, and is held therein by pin 146 engaging in slots 148 in said weights connecting with and extending from the sides of slots 144. It should be pointed out, however, that there may be substituted for element 140 any element adapted to carry a plurality of centrifugal weights as shown, and that the means for attaching said weights thereto may similarly be varied in many ways which will be apparent to others skilled in the art.

Each of weights 145 in Figs. 12 and 13 is adapted to carry a plurality of clutch shoes 150. The mounting means shown for said shoes are substantially the same as one form of mounting means described in connection with Figs. 10 and 11, as will be apparent from a comparison of Fig. 11 with Fig. 13. Any other suitable mounting means may be used instead. There may also be provided suitable means for imparting initial load to shoes 150, such for example as spring means (not shown) similar to the spring means described in connection with Figs. 10 and 11, or the springs may be dispensed with and the operation of the device depend solely upon centrifugal action to produce frictional engagement between the clutch shoes and associated drum. The operation of this embodiment of the invention is substantially the same as that of the other embodiments described above. The advantage of this modification of the device lies primarily in the fact that the load transmitted by the weights and shoes is more evenly distributed over the circumference of the drum. Another advantage is derived from the fact that the effective distance of the center of gravity of the mass from the center of the driving shaft is considerably increased.

Figs. 14 and 15 show a still further modification of the invention and more specifically a modification of the structure shown and described in connection with Figs. 10 and 11. The device shown in Figs. 14 and 15 is provided with a plurality of weights 152 which are substantially like the weights 125 described in connection with the embodiment of the invention disclosed in Figs. 10 and 11. The weights 152 are mounted for radial movement on the arms 154 extending from the driving shaft, the mounting means comprising for example pins 156 extending into slots 158 in the arms 154. The weights 152 differ essentially from the weights 125 illustrated in Figs. 10 and 11 in that each weight 152 has incorporated therewith as integral extensions therefrom a plurality of shoe elements 160. As shown in detail in Fig. 14, the forward edge of each shoe element 160 may be bevelled, as shown for example at 162, so that a wedge-shaped gap is provided between that portion of the face of each shoe and the interior of the drum 164 mounted on the driven shaft. It should be understood that the angle made by the forward portion of each shoe face and the interior of the drum is preferably uniformly small, for example in the order of only a few minutes. It is shown exaggerated in the drawings for the purpose of illustration.

Spring means 155 may preferably be provided, identical with the spring means shown in Fig. 10, to press the weights outwardly and cause initial engagement between the shoes 160 and the drum 164.

In operation, the device shown in Figs. 14 and 15 functions substantially as do the devices previously described. In the device shown in Figs. 14 and 15, however, the clutch shoes are not pivotally mounted. When the load applied to the driven shaft is great enough to overcome friction between the shoes 160 and the drum 164, and when the shoes begin to slip against the inner face of the drum, the wedge of oil or other lubricant present in the space between the forward edge of each shoe and the inner surface of the drum spreads rapidly between the contacting surface of each shoe and the drum wall, thus causing free slippage of the shoe bearing elements against the drum. The elements 152 may be forced radially inward against the centrifugal force tending to keep the shoes in contact with the inner surface of the drum and against the action of the spring means. Re-engagement of the clutch may be accomplished in any of the ways described in connection with any of the other embodiments of the invention.

Figs. 16 and 17 show a modification of the invention embodying means for preventing initial slippage of the clutch when motion is first imparted to the driving shaft from a stationary position. Driving shaft 170 has keyed or pinned thereto at 171 a weight-carrying member 172 provided with a plurality of radially extending arms, at the end of each of which there is pivotally mounted, as by means of a pin 174, a bell crank lever 175. At one end of each of cranks 175 there is an inertia weight 176, and at the other end is pivotally mounted, as by means of a pin 178, a clutch shoe 180. Means are preferably provided for imparting a spring load to shoes 180, an example of such means being shown as comprising an eared lug 182 formed on or secured to each of the arms of member 172 and carrying a spring 184, the other end of which bears against one of inertia weights 176. The whole assembly may be enclosed in a housing 186 of any desired shape, preferably partially filled with a suitable lubricant 188 as shown.

With this embodiment of the invention, when the driving shaft begins to rotate from a stationary position, as for example in a clockwise direction as viewed in Fig. 16, the inertia of weights 176 will tend to cause cranks 175 to pivot on pins 174, also in a clockwise direction. This will result in adding the load of weights 176 to the load imparted to shoes 180 by springs 184, which will increase the friction between said shoes and drum 190 and decrease the chance of slippage therebetween. Then as shaft 170 continues rotation, springs 184 will keep shoes 180 in continued frictional contact with drum 190, and this effect will be increased by the action of centrifugal force on the outer ends of cranks 175. At the same time, as in the other embodiments of the invention already described, slippage will result when excess load is applied on driven shaft 192, and when this result occurs re-engagement may be accomplished in the same manner as in the other embodiments of the invention.

In Figs. 18 and 19 there is shown a modification of the invention which combines certain of the features of the embodiments shown in Figs. 1 and 5. Driving shaft 194 has pinned or otherwise secured thereto at 196 a drum 198, and driven shaft 200 has similarly secured thereto at 202 a smaller drum 204. Journaled in the rim of drum 198 and radially slidable therein are a plurality of arms 206 each of which has suitably mounted at the inner end thereof, as by means of a pin 208 and ears 212, a clutch shoe 210 adapted to engage the outer rim of drum 204. Adjacent the inner end of each of arms 206 is a shoulder 214, and at the outer end thereof there is mounted in any suitable way a centrifugal weight 215, and the entire assembly is enclosed in a housing 218 of any desired type, preferably partially filled with a suitable lubricant 219. As in the embodiment of the invention shown in Fig. 1, the operative frictional contact between shoes 210 and drum 205 is accomplished by means of springs 216, mounted between shoulders 214 and the inside of drum 198.

Under normal conditions of operation, the embodiment of the invention shown in Figs. 18 and 19 will function in substantially the same manner as the embodiment described above in connection with Figs. 1-4. Engagement of the clutch is produced by the pressure of springs 216 forcing arms 206 radially inwards and hence forcing shoes 210 into solid-to-solid contact with the outer rim of drum 204. When excess load is applied on driven shaft 200, slippage will result between shoes 210 and drum 204 in the same manner as was described above in connection with Figs. 1–4. In this modification of the invention, however, excess speed is prevented by reason of the fact that in the event of such speed, centrifugal weights 215 will tend to overcome the tension of springs 216 and hence draw shoes 210 out of engagement with drum 204. This feature is particularly useful in making possible rapid and complete disengagement of the clutch as soon as any slippage occurs, since the resulting immediate speeding up of the driving shaft will bring into operation the disengaging action of the weights 215.

The embodiment of the invention shown in Figs. 20 and 21 is similar to those already described, but employs modified means for introducing the desired film of lubricant between the clutch shoes and cooperating drum surface in the event of relative movement between the driving and driven shafts. Drum 220 is pinned or otherwise secured at 221 to driven shaft 222 which in addition has secured to its outer end, as by means of a pin 224, a gear 225. Driving shaft 226 has keyed or otherwise secured thereto at 227 a housing 228 provided with a plurality of radially extending arms 230. The outer end of each of arms 230 engages an aperture in one of centrifugal weights 232 and is slotted to receive a pin 234 slidable therein, thus making it possible for weights 232 to move radially with respect to shaft 226. Weights 232 are provided with integrally formed shoe portions 236 adapted to engage the inner side of drum 220.

Within housing 228 is mounted, as by means of pins 237 carried by said housing, a pair of gears 238 engaging gear 225. The interior of housing 228 is connected by means of tubes 240 and fittings 242 to passages 244, leading through weights 232 to the outer face of each of shoes 235. Housing 228 also carries a pair of scoop tubes 245 adapted to provide communication between the interior thereof and the interior of outer housing 246. If desired, the device may be amplified to include springs 247 positioned between housing 228 and weights 232, as for example in the manner shown in Fig. 5, to insure initial frictional contact between the shoes and the drum.

It is believed that the operation of the above described device will now be apparent. When shafts 222 and 226 are rotating at the same speed, as in the direction indicated by arrow 248, centrifugal force acting on weights 232 will keep shoes 236 in contact with drum 220 and maintain clutching engagement. Furthermore, since gear 225 is rotating at the same speed as shaft 226 in housing 228, there will be no relative motion between gear 225 and gears 238.

If now excess load is applied on shaft 222 such that relative motion is produced between the shafts, then gears 238 will rotate with respect to gear 225 and will act to pump oil 250 from the interior of housing 246 through tubes 245 and 240 and passages 244, and force the oil between the contacting faces of shoes 236 and drum 220, thus producing positive disengagement of the clutch. Slippage will accordingly occur until the speeds of the two shafts are again synchronized, at which time the action of the oil pump will cease and shoes 236 will again be forced into solid-to-solid contact with drum 220. It will be seen that the principle of this modification of the invention is the same as that of the other embodiments above described, in that the clutch is in engagement at all times when the speeds of the driving and driven shafts are synchronized, but is disengaged by the introduction of an oil film between the shoes and drum in the event of any relative motion between the shafts.

It should be noted also that a preferred condition is one in which the passages 244 lead to points adjacent the forward or leading edges of the clutch shoes 236.

A still further modification of the invention is shown in Figs. 22 and 23. This modification is somewhat similar to that described in connection with Figs. 16 and 17. Driving shaft 252 has keyed or otherwise secured thereto at 254 an element 256 provided with a plurality of radially extending arms 258, at the outer end of each of which there is pivotally mounted, as by means of a pin 260, a lever arm 262. At its outer end each of arms 262 comprises a counterweight 264, and each of said levers also carries one or more clutch shoes 268 mounted therein in any suitable way, as by means of a pin 270 engaging in the sides of a slot, as is shown more clearly in Fig. 23. As in the other embodiments already described, shoes 268 are preferably initially spring loaded, as by means of springs 272 engaging the ends respectively of arms 258 and weights 264, and mounted in any suitable way. Housing 274 may be of any desired conventional design, and as in other embodiments already described is preferably partially filled with a suitable lubricant.

The operation of this embodiment of the invention is analogous to that of the others already described. Sufficient static friction is set up between shoes 268 and drum 276, as by means of springs 272, to overcome the inertia of whatever load may be on shaft 278, to which the drum is keyed, and then as the driving shaft's speed is accelerated, centrifugal force acting on counterweights 186 will increase the friction, as in the devices previously described. Slippage will be caused with this embodiment of the invention in the same way as in the others above described, and re-engagement may similarly be accomplished. The advantage of this form of construction lies to a considerable extent in the fact that a given load may be carried by the clutch with less mass of the centrifugal weights because of the leverage obtained by locating the shoes closer to the fulcrum of levers 262 than the center of gravity of the weights.

Figs. 24–29 relate to a modification of the invention wherein means are provided for controlling the torque characteristics of the clutch of the invention. In these views element 300 represents the driving shaft and element 302 represents the driven shaft, although it should be understood that the relation of the two shafts and their associated clutch elements may be reversed without altering the principles of the device or departing from the scope of the invention. Driven shaft 302 has integrally formed thereon or otherwise secured thereto a drum member 305 which, in the embodiment shown in these figures also constitutes part of a housing for the remainder of the clutch assembly, the rest of the housing being formed by disk 304 secured as by means of a set screw 307 to a sleeve or similar member 306 freely rotatable on driving shaft 300. It will be understood, however, that this embodiment of the invention is not limited to this modified use of drum 305, and that the drum elements and related elements shown and described above may be modified without in any way affecting the scope of the invention.

Driving shaft 300 has secured thereon as by means of pins 308 a weight-carrying element 310 similar to element 258 in Figs. 22 and 23, having pivotally mounted at each end thereof, as by means of pins 311, a pair of centrifugal weights 312. Weights 312 in turn have pivotally mounted therebetween at 313 a third, similar weight 314. Each of weights 312 and 314 has mounted therein, as by means of set screws 316, a flat spring 318 bearing against clutch shoe 320. As is shown most clearly in Figs. 24 and 25, engagement between springs 318 and shoes 320 may conveniently be secured by providing each of said springs with a lug 322 similar to pegs 42 in Figs. 1–4 and engaging in a complementary socket in said shoe, but it will be understood that any similar mounting means may be used for the same purpose. It should further be understood that any other suitable spring mounting for shoes 320 may be used provided the mounting is such that the load on the spring may be altered as a result of movement of weights 312 and 314 with respect to said shoe.

At the opposite end from that at which it is mounted, each of weights 312 and 314 is formed with a shoulder or tongue 324, adapted to fit within and engage one of flanges 325 at the ends of the arms of element 310. As is shown by the dotted lines in Figs. 24, 27 and 28, tongue 324 on weight 314 is smaller than tongues 324 on weights 312. Said tongues and flanges combine to form stops limiting the amount of movement which can be imparted to weights 312 and 314 by centrifugal force. However, it will be seen that the difference in size between the tongues on the different weights results in causing weights 312 to reach the limit of their outward movement before weight 314.

The purpose and operation of the embodiment of the invention shown in Figs. 24–28 may be explained most clearly in connection with Figs. 27–29. Fig. 29 illustrates various relationships between torque and R. P. M. Curve 330 represents the average full throttle torque curve of a conventional engine, such as might be utilized to rotate driving shaft 300. Curve 333 represents the maximum torque which can be transmitted by a clutch such as that shown in Figs. 25–28 if it comprised only weights 312 and their associated springs 318. It will be seen that with such a clutch the torque is relatively low at zero R. P. M. since the only load on shoes 320 is that caused by the tension of springs 318, which may be only just sufficient to keep the shoes in place. However, as the driven shaft begins to rotate the torque increases rapidly by reason of the fact that outward movement of weights 312 produced by centrifugal force increases the load on springs 318, and that load is transferred to the shoes. The torque reaches a peak at the point of engagement between tongues 324 and stop 325. At this point it levels out into a substantially flat curve, since the weights can move no further and the load on the springs is therefore a maximum.

Curve 335 in Fig. 29 illustrates the torque characteristics of the embodiment of the invention shown in Figs. 24–28 utilizing both weights 312 and weights 314. At zero R. P. M. there will be only such torque as derives from the tension of springs 318. As driving shaft 300 begins to rotate and accelerate from the position shown in Fig. 24, the torque increases rapidly by reason of the outward movement of weights 312 and 314. Up to the speed at which tongues 324 on weights 312 engage stop 325, all three weights are exerting their forces equally on the shoe. Point A on curve 335 represents the point at which further outward movement of weights 312 is prevented, and at this point the parts are in the relative positions indicated in Fig. 27. If the system included only weights 312, the torque curve would then flatten out in the same manner as curve 333. However, weight 315 has not reached the limit of its outward movement, and tension on its spring is accordingly subject to further increase, this period of acceleration being represented by the portion of curve 335 between A and B.

Point B on curve 335 represents the point at which the tongue 324 on weight 314 encounters stop 325, in the manner indicated in Fig. 28. Beyond this point there can be no further increase in tension on any of springs 318 and it follows that this represents the maximum torque which can be transmitted by the clutch. Any further increase in load will result in slippage between shoes 320 and drum 305 in precisely the same manner as has been described above in connection with the other embodiments of the invention, and when slippage occurs re-engagement is accomplished in the same manner as is described above.

It is to be understood that the embodiment of the invention shown in Figs. 24–28 is shown merely as an example of one means of providing the clutch of the invention with torque characteristics such as those represented by curve 335. Many modifications of this embodiment will doubtless be apparent to those skilled in the art, and are to be considered as coming within the scope of the invention. For example, it is not essential to have a pair of weights 312, and this particular construction is shown merely by way of illustration. Furthermore, by the addition of further weights and stops, it will be possible to secure torque characteristics more complicated than those represented by curve 335 and thus to provide a clutch capable of operating under virtually any conditions.

The embodiments of the invention disclosed and described in connection with the drawings represent some of many modifications embodying novel principles of operation of the invention. It is to be understood that further modifications of the invention embodying the novel principles of operation thereof are to be deemed to fall within the scope of the claims. For example, in the embodiments of the invention shown in the drawings the clutch shoes and related elements have been mounted in sliding relation to the shaft with which they are associated. It will be apparent that in certain embodiments of the invention, and particularly in the embodiment of the invention shown in Figs. 1–4 for example, the clutch shoes and the shoe-carrying means may be mounted fixedly for rotation with the driving or driven shaft and the cooperating clutch element, for example the disk against which the clutch shoes bear, may be mounted against spring tension to slide along the shaft with which it is associated so that when slippage occurs between the clutch shoes and the disk member against which they bear, the disk will yield to permit the entry of a thin film of lubricant between the shoes and the disk and to permit the shoes to tilt slightly in the manner previously described in connection with this embodiment of the invention.

So also, both clutch engaging assemblies, i. e., the clutch shoes and the disk against which they bear, may be mounted to slide along the shafts with which they are related against spring tension so that when slippage occurs both assemblies yield slightly.

Since certain changes may be made in the above device and different embodiments of the invention could be made without departing from its scope, it is intended that all matter contained in the above description or shown in the accompanying drawings shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

1. A clutch mechanism comprising an assembly of driving elements, an assembly of driven elements, means for holding elements of said assemblies in unlubricated static frictional contact whenever there is no relative motion between said assemblies, said means comprising movable weighted elements associated with the assembly of driving elements and adapted to increase the torque transmitted by said assemblies with increase in the speed of rotation thereof, and means providing a lubricant, said last-named means and said assemblies being so constructed and arranged that continuous films of lubricant are provided between the contacting surfaces of the said elements of said assemblies whereby they slide freely upon one another whenever there is relative motion between said assemblies.

2. A clutch mechanism comprising an assembly of driving elements, an assembly of driven elements, means for holding elements of said assemblies in unlubricated static frictional contact whenever there is no relative motion between said assemblies, said means comprising movable weighted elements associated with the assembly of driving elements and adapted to vary the torque transmitted by said assemblies with increase in the speed of rotation thereof, and pump means actuated by the rotation of one of said assemblies relative to the other for providing and maintaining continuous films of lubricant between the contacting surfaces of the said elements of said assemblies whereby they slide freely upon one another whenever there is relative motion between said assemblies.

3. A clutch mechanism comprising a rotatable driving member, a rotatable driven member, means providing friction surfaces carried by each said member, means carried by at least one of said members for holding said surfaces in contact when said members rotate in synchronism, and pump means actuated by rotation of said members relative to each other for providing a lubricant between said friction surfaces when said members rotate relatively with respect to each other.

4. A clutch mechanism comprising a rotatable driving member, a rotatable driven member, means providing friction surfaces carried by each said member, spring means adapted to force said surfaces into contact, and pump means actuated by rotation of said members relative to each other for providing continuous lubricating films between said friction surfaces when said members rotate relatively with respect to each other.

5. A clutch mechanism comprising a rotatable driving member, a rotatable driven member, means providing friction surfaces carried by each said member, spring means adapted to force said surfaces into contact, centrifugally responsive weights carried by said driving member and cooperating with the friction surfaces carried thereby to increase the torque transmitted between the driving and driven members with increase in the speed of rotation thereof, and means providing a lubricant between said friction surfaces when said members rotate relatively with respect to each other.

6. A clutch mechanism comprising a rotatable driving member, a rotatable driven member, means providing friction surfaces carried by each said member, spring means adapted to force said surfaces into contact, pivotally mounted centrifugally responsive weights carried by said driving member and cooperating with the friction surfaces carred thereby to increase the torque transmitted between the driving and driven members with increase in the speed of rotation thereof, and means providing a lubricant between said friction surfaces when said members rotate relatively with respect to each other.

7. A clutch mechanism comprising a rotatable driving member, a rotatable driven member, means providing friction surfaces carried by each said member, means comprising spring means and centrifugally responsive weights for holding said surfaces in contact with a high coefficient of friction whenever there is no relative motion between said rotatable members, and means for causing disengagement of said surfaces with a low coefficient of friction whenever there is relative motion between said members, said last-named means comprising a lubricating pump having elements thereof mounted on said driving member and on said driven member and actuated by relative rotation between said driving member and said driven member.

8. A clutch mechanism comprising a rotatable driving member, a rotatable driven member, means providing friction surfaces carried by each said member, means comprising spring means for holding said surfaces in contact with a high coefficient of friction whenever there is no relative motion between said rotatable members, and lubricating means for causing disengagement of said surfaces with a low coefficient of friction whenever there is relative motion between said members, said last-named means comprising a lubricating pump having elements thereof mounted on said driving member and on said driven member and actuated by relative rotation between said driving member and said driven member.

9. In a clutch, in combination, a rotatable driving member, a rotatable driven member, a plurality of clutch shoes carried by one of said members, means providing a continuous shoe-engaging surface carried by the other of said members, spring means for holding said shoes in engagement with said surface, and means for introducing a lubricant between said shoes and said surface whenever there is relative motion between said members, said last-named means comprising a lubricating pump having elements thereof mounted on said driving member and on said driven member and actuated by relative rotation between said driving member and said driven member.

10. In a clutch, in combination, a rotatable driving member, a rotatable driven member, a plurality of clutch shoes carried by one of said members, means providing a continuous shoe-engaging surface carried by the other of said members, spring means for holding said shoes in engagement with said surface, weighted members associated with said shoes and adapted, upon rotation of the shoe-carrying member, to increase the force with which said shoes are pressed into contact with said shoe-engaging surface as the speed of said members increases, and lubricating means cooperating with said shoes for introducing and maintaining continuous films of lubricant between said shoes and said surface whenever there is relative motion between said members to effect substantially complete disengagement between said shoes and said shoe-engaging surface.

11. In a clutch, in combination, a rotatable driving member, a rotatable driven member, a plurality of clutch shoes carried by one of said members, means providing a continuous shoe-engaging surface carried by the other of said members, spring means for holding said shoes in engagement with said surface, weighted members associated with said shoes and adapted, upon rotation of the shoe-carrying member, to vary the frictional engagement between said shoes and said shoe-engaging surface, and lubricating means cooperating with said shoes for introducing and maintaining continuous films of lubricant between said shoes and said surface whenever there is relative motion between said members to effect substantially complete disengagement between said shoes and said shoe-engaging surface.

12. In a clutch, in combination, a rotatable driving member, a rotatable driven member, a plurality of clutch shoes carried by one of said members, means providing a continuous shoe-engaging surface carried by the other of said members, spring means for holding said shoes in engagement with said surface, a plurality of centrifugally responsive weighted members associated with each of said clutch shoes and adapted to move radially in response to rotation of said shoe-carrying member, means to limit differently the radial movement of different ones of said weighted members, said weighted members being adapted to increase the torque transmitted by said clutch with increase in the speed of rotation of said driving member, and means for introducing a lubricant between said shoes and said surface whenever there is relative motion between said members.

13. In a clutch, in combination, a rotatable driving member, a rotatable driven member, a plurality of clutch shoes carried by one of said members, means providing a continuous shoe-engaging surface carried by the other of said members, spring means for holding said shoes in engagement with said surface, and means for introducing a lubricant between said shoes and said surface whenever there is relative motion between said members, said last-mentioned means comprising a pump operative when the speed of rotation of the driving member exceeds the speed of rotation of the driven member.

14. A friction clutch of the character described comprising, in combination, a rotatable driving shaft, a plurality of clutch shoes carried by said shaft and radially movable with respect thereto, a rotatable driven shaft, a shoe-engaging drum carried by said shaft, spring means for forcing said shoes into engagement with said drum, centrifugally responsive weights cooperating with said spring means to increase the torque transmitted by said clutch as the speed of rotation of said shafts increases, and means for introducing a lubricant between said shoes and said drum when the speed of rotation of one of said shafts exceeds the speed of rotation of the other of said shafts.

15. A friction clutch of the character described comprising, in combination, a rotatable driving shaft, a plurality of clutch shoes carried by said shaft and radially movable with respect thereto, a rotatable driven shaft, a shoe-engaging drum carried by said shaft, spring means for forcing said shoes into engagement with said drum, centrifugally responsive weights cooperating with said spring means to increase the torque transmitted by said clutch as the speed of rotation of said shafts increases, said clutch shoes being tiltably mounted on said weights, and means for introducing a lubricant between said shoes and said drum when the speed of rotation of one of said shafts exceeds the speed of rotation of the other of said shafts.

16. A friction clutch of the character described comprising, in combination, a rotatable driving shaft, a plurality of clutch shoes carried by said shaft and radially movable with respect thereto, a rotatable driven shaft, a shoe-engaging drum carried by said shaft, spring means for forcing said shoes into engagement with said drum, centrifugally responsive weights cooperating with said spring means to increase the torque transmitted by said clutch as the speed of rotation of said shafts increases, said weights being pivotally mounted on arms extending radially from said driving shaft, and means for introducing a lubricant between said shoes and said drum when the speed of rotation of one of said shafts exceeds the speed of rotation of the other of said shafts.

17. A friction clutch of the character described comprising, in combination, a rotatable driving shaft, a plurality of clutch shoes carried by said shaft and radially movable with respect thereto, a rotatable driven shaft, a shoe-engaging drum carried by said shaft, spring means for forcing said shoes into engagement with said drum, centrifugally responsive weights cooperating with said spring means to increase the torque transmitted by said clutch as the speed of rotation of said shafts increases, said weights and said shoes being pivotally mounted on arms extending radially from said driving shaft, and means for introducing a lubricant between said shoes and said drum when the speed of rotation of one of said shafts exceeds the speed of rotation of the other of said shafts.

18. A friction clutch of the character described comprising, in combination, a rotatable driving shaft, a plurality of clutch shoes carried by said shaft and radially movable with respect thereto, a rotatable driven shaft, a shoe-engaging drum carried by said shaft, spring means for forcing said shoes into engagement with said drum, centrifugally responsive weights cooperating with said spring means to increase the torque transmitted by said clutch as the speed of rotation of said shafts increases, said weights being pivotally mounted on arms extending radially from said driving shaft, there being a plurality of said weights associated with each clutch shoe, means to limit differently the radial motion of predetermined ones of each of said plurality of weights, and means for introducing a lubricant between said shoes and said drum when the speed of rotation of one of said shafts exceeds the speed of rotation of the other of said shafts.

19. In a clutch, in combination, a rotatable driving member, a rotatable driven member, a plurality of clutch shoes carried by one of said members, means providing a continuous shoe-engaging surface carried by the other of said members, means for mounting said clutch shoes to tilt about axes substantially perpendicular to the direction of rotation of said members, each said tilting axis being closer to the trailing edge of each said shoe than to the forward edge thereof, spring means for holding said shoes in engagement with said surface, and means for introducing a lubricant between said shoes and said surface whenever there is relative motion between said members.

20. In a clutch, in combination, a rotatable driving member, a rotatable driven member, a plurality of clutch shoes carried by one of said members, each of said shoes being wider than it is long, means providing a continuous shoe-engaging surface carried by the other of said members, means for mounting said clutch shoes to tilt about axes substantially perpendicular to the direction of rotation of said members, each said tilting axis being closer to the trailing edge of each said shoe than to the forward edge thereof, spring means for holding said shoes in engagement with said surface, and means for introducing a lubricant between said shoes and said surface whenever there is relative motion between said members.

21. A friction clutch of the character described comprising, in combination, a rotatable driving shaft, a plurality of clutch shoes carried by said shaft and radially movable with respect thereto, each of said shoes being wider than it is long, a rotatable driven shaft, a shoe-engaging drum carried by said shaft, spring means for forcing said shoes into engagement with said drum, and means for introducing a lubricant between said shoes and said drum when the speed of rotation of one of said shafts exceeds the speed of rotation of the other of said shafts.

22. A friction clutch of the charatcer described comprising, in combination, a rotatable driving shaft, a plurality of clutch shoes carried by said shaft and radially movable with respect thereto, each of said shoes being wider than it is long and being pivoted to tilt about an axis substantially perpendicular to the direction of rotation of said driving shaft, said axis being closer to the trailing edge of said shoe than to the forward edge thereof, a rotatable driven shaft, a shoe-engaging drum carried by said shaft, spring means for forcing said shoes into engagement with said drum, and means for introducing a lubricant between said shoes and said drum when the speed of rotation of one of said shafts exceeds the speed of rotation of the other of said shafts.

23. A clutch of the character described comprising, in combination, a rotatable driving member, a rotatable driven member, a plurality of clutch shoes carried by one of said members, centrifugally responsive weights carried by said member and acting to increase the torque transmitted by said clutch as the speed of rotation of said members increases, said weights being pivotally mounted on arms extending radially from the member carrying said weights, said clutch shoes being mounted on said weights between the centers of gravity thereof and the pivots about which said weights are adapted to move, a shoe-engaging drum carried by the other of said rotatable members, spring means for holding said clutch shoes in engagement with said drum, and means for introducing a lubricant between said shoes and said drum when the speed of rotation of one of said members exceeds the speed of rotation of the other of said members.

24. A clutch of the character described comprising, in combination, a rotatable driving member, a rotatable driven member, a plurality of clutch shoes carried by one of said members, centrifugally responsive weights carried by said member and acting to increase the torque transmitted by said clutch as the speed of rotation of said members increases, said weights being pivotally mounted on arms extending radially from the member carrying said weights, said clutch shoes being mounted on said weights between the centers of gravity thereof and the pivots about which said weights are adapted to move, each said shoe being tiltable about an axis substantially perpendicular to the direction of rotation of said members, a shoe-engaging drum carried by the other of said rotatable members, spring means for holding said clutch shoes in engagement with said drum, and means for introducing a lubricant between said shoes and said drum when the speed of rotation of one of said members exceeds the speed of rotation of the other of said members.

25. A clutch of the character described comprising, in combination, a rotatable driving member, a rotatable driven member, one of said members carrying means providing a continuous clutch-engaging surface, the other of said members carrying a plurality of clutch shoes, means for holding said shoes in engagement with said surface, a centrifugally-responsive weighted element associated with each clutch shoe and adapted to change the load on said shoe with acceleration in the speed of rotation of the shoe-carrying member, and lubricating means cooperating with said shoes and said clutch-engaging surface for providing a continuous lubricating film between and causing disengagement of said clutch shoes and said shoe-engaging surface with substantially no coefficient of friction whenever there is relative motion between said members.

26. A clutch of the character described comprising, in combination, a rotatable driving member, a rotatable driven member, one of said members carrying means providing a continuous clutch-engaging surface, the other of said members carrying a plurality of clutch shoes, means for holding said shoes in engagement with said surface, a centrifugally-responsive weighted element associated with each clutch shoe and adapted to increase the load on said shoe with acceleration in the speed of rotation of the shoe-carrying member, each said weight having a clutch shoe tiltably mounted thereon, and means for introducing a lubricant between said shoes and said shoe-engaging surface when the speed of rotation of one of said members exceeds the speed rotation of the other of said members.

27. A clutch mechanism comprising a rotatable driving member, a rotatable driven member, a plurality of centrifugally responsive weights pivotally mounted on one of said members, clutch shoes, resilient means for mounting said clutch shoes on said weights whereby rotation of said weight-carrying member increases the load on said shoes with increase in the speed of rotation of said member, means for predeterminedly limiting said load when the rotation of said member reaches a predetermined speed, means providing a continuous clutch-engaging surface carried by the other of said rotating members, said surface being positioned to be in contact with said clutch shoes, and means for introducing a lubricant between said shoes whenever there is relative motion between said rotating members.

28. In a clutch of the character described, in combination, a rotatable driving member, a rotatable driven member, a plurality of arms extending radially from one of said members, a plurality of centrifugally responsive weights pivotally mounted on each of said arms, a clutch shoe resiliently mounted on each said plurality of weights, means providing a clutch-engaging surface carried by the other said member, said weights and shoes being so mounted that as said weight-carrying member rotates said weights move outwardly therefrom against the force of the resilient member whereby the load on said clutch shoes is increased, means for limiting differently the outward motion of different ones of each said plurality of weights whereby the degree of increase of load on said clutch shoes as the speed of rotation of said weight-carrying member increases may be predeterminedly controlled, and means for introducing a lubricant between said shoes and said surface when there is relative motion between said driving and driven members.

29. In a clutch of the character described, in combination, a rotatable driving member, a plurality of arms extending radially therefrom, a plurality of centrifugally responsive weights pivotally mounted on each of said arms, a clutch shoe resiliently mounted on each said plurality of weights, means providing a clutch-engaging surface carried by a driven member, said weights and shoes being so mounted that as said driving member rotates said weights move outwardly therefrom against the force of the resilient member whereby the load on said clutch shoes is increased, means for limiting differently the outward motion of different ones of each said plurality of weights whereby the degree of increase of load on said clutch shoes as the speed of rotation of said driving member increases may be predeterminedly controlled, and means for introducing a lubricant between said shoes and said surface when there is relative motion between said driving and driven members, each said clutch shoe being tiltably mounted on said resilient means to tilt about an axis substantially perpendicular to the direction of rotation of said driving member and positioned closer to the trailing edge of said shoe than to the forward edge thereof.

30. In a clutch, in combination, a rotatable driving member, a rotatable driven member, a plurality of clutch shoes carried by one of said members, means providing a continuous shoe-engaging surface carried by the other of said members, means for holding said shoes in engagement with said surface, said shoes having a clearance between their leading edges and said surface, means for mounting said shoes for limited radial displacement relative to said surface, said last-named means comprising a plurality of weighted members integrally connected to said shoes and adapted to vary with changes in speed the maximum torque which can be transmitted between said shoes and said surface, and lubricating means cooperating with said clutch shoes and said shoe-engaging surface so as to introduce and maintain a continuous film of lubricant between said shoes and said surface whenever there is relative motion between said members.

31. In a clutch, in combination, a rotatable driving member, a rotatable driven member, a plurality of clutch shoes carried by one of said members, means providing a continuous shoe-engaging surface carried by the other of said members, means for mounting said clutch shoes to tilt about axes substantially perpendicular to the direction of rotation of said members, each said tilting axis being closer to the trailing edge of each said shoe than to the forward edge thereof, means for holding said shoes in engagement with said surface, and means cooperating with said shoes for introducing a lubricant between said shoes and said surface whenever there is relative motion between said members.

32. In a clutch, in combination, a rotatable driving member, a rotatable driven member, a plurality of clutch shoes carried by one of said members, means providing a continuous shoe-engaging surface carried by the other of said members, each said shoe having a friction surface conforming to the surface curvature of said continuous shoe-engaging surface, means for holding said shoes in engagement with said shoe-engaging surface while transmitting torque, and means cooperating with said shoes for introducing a lubricant between said shoes and said surface whenever there is relative motion between said members.

33. In a clutch, in combination, a rotatable driving member, a rotatable driven member, a plurality of clutch shoes carried by one of said members, means providing a continuous shoe-engaging surface carried by the other of said members, each said shoe having a friction surface conforming to the surface curvature of said continuous shoe-engaging surface, means for holding said shoes in engagement with said shoe-engaging surface while transmitting torque, and means for mounting said shoes to tilt about axes substantially perpendicular to the direction of rotation of said members, said last-named means cooperating with said shoes to introduce a lubricant between said shoes and said surface whenever there is relative motion between said members.

34. In a clutch, in combination, a rotatable driving member, a rotatable driven member, a plurality of clutch shoes carried by one of said members, means providing a continuous shoe-engaging surface carried by the other of said members, each said shoe having a friction surface conforming to the surface curvature of said continuous shoe-engaging surface, means for holding said shoes in engagement with said shoe-engaging surface while transmitting torque, and pump means for introducing a lubricant between said shoes and said shoe-engaging surface whenever there is relative motion between said members.

35. In a clutch, in combination, a rotatable driving member, a rotatable driven member, a plurality of clutch shoes carried by one of said members, means providing a continuous shoe-engaging surface carried by the other of said members, each said shoe having a friction surface conforming to the surface curvature of said continuous shoe-engaging surface, and means for holding said shoes in engagement with said shoe-engaging surface while transmitting torque, each said shoe having a leading portion inclined to said surfaces to introduce a lubricant between said shoes and said shoe-engaging surface whenever there is relative motion between said members.

36. In a clutch, in combination, a rotatable driving member, a rotatable driven member, a plurality of clutch shoes carried by one of said members, means providing a continuous shoe-engaging surface carried by the other of said members, means for holding said shoes in engagement with said surface, said shoes having a clearance between their leading edges and said surface, means for mounting said shoes for limited radial displacement relative to said surface, said last-named means comprising a plurality of weighted members connected to said shoes and adapted to vary with changes in speed the maximum torque which can be transmitted between said shoes and said surface, and lubricating means cooperating with said clutch shoes and said shoe-engaging surface so as to introduce and maintain a continuous film of lubricant between said shoes and said surface whenever there is relative motion between said members.

OTTO E. WOLFF.

Certificate of Correction

Patent No. 2,400,585.                                                                                           May 21, 1946.

OTTO E. WOLFF

It is hereby certified that error appears in the printed specification of the above numbered patent requiring correction as follows: Page 8, line 61, claim 3, strike out "a lubricant" and insert instead *continuous lubricating films*; and that the said Letters Patent should be read with this correction therein that the same way may conform to the record of the case in the Patent Office.

Signed and sealed this 15th day of July, A. D. 1947.

[SEAL]

LESLIE FRAZER,
*First Assistant Commissioner of Patents.*